United States Patent
Ho et al.

(10) Patent No.: US 12,331,971 B2
(45) Date of Patent: Jun. 17, 2025

(54) INTEGRATED MID-PRESSURE WATER SEPARATOR

(71) Applicant: Hamilton Sundstrand Corporation, Charlotte, NC (US)

(72) Inventors: Tony Ho, Glastonbury, CT (US); Donald E. Army, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 114 days.

(21) Appl. No.: 17/471,435

(22) Filed: Sep. 10, 2021

(65) Prior Publication Data
US 2023/0077365 A1    Mar. 16, 2023

(51) Int. Cl.
F25B 43/00    (2006.01)
F25B 9/00     (2006.01)
F25B 9/06     (2006.01)

(52) U.S. Cl.
CPC ............ F25B 43/006 (2013.01); F25B 9/004 (2013.01); F25B 9/06 (2013.01)

(58) Field of Classification Search
CPC ........... F25B 43/006; F25B 9/004; F25B 9/06
See application file for complete search history.

(56) References Cited

U.S. PATENT DOCUMENTS

| | | | |
|---|---|---|---|
| 3,676,987 A * | 7/1972 | Wunder | B04C 3/00 55/459.1 |
| 4,681,610 A | 7/1987 | Warner | |
| 6,331,195 B1 | 12/2001 | Faust et al. | |
| 10,160,547 B2 | 12/2018 | Bruno et al. | |
| 10,744,437 B2 | 8/2020 | Himmelmann | |
| 2014/0230649 A1 * | 8/2014 | Cao | B01D 53/22 95/47 |
| 2015/0314877 A1 * | 11/2015 | McAuliffe | B64D 13/06 62/61 |
| 2019/0015844 A1 | 1/2019 | Monacchio et al. | |
| 2021/0301682 A1 * | 9/2021 | Fujita | G21D 1/02 |

FOREIGN PATENT DOCUMENTS

EP        3369470 A1 *    9/2018    ............ B01D 45/06

OTHER PUBLICATIONS

European Search Report for European Application No. 22192845.0; dated Jan. 31, 2023; 73 pages.

\* cited by examiner

*Primary Examiner* — Larry L Furdge
*Assistant Examiner* — Keith Stanley Myers
(74) *Attorney, Agent, or Firm* — CANTOR COLBURN LLP

(57) ABSTRACT

A water separator includes an outer annular passage extending along a central longitudinal axis of water separator to direct an airflow along a first direction, and an inner annular passage located radially inboard of the outer annular passage and coaxial with the outer annular passage to direct the airflow along a second direction. A coalescer is located along the outer annular passage to coalesce water in the airflow. A water collector is located along the inner annular passage to collect the water. An airflow outlet is located downstream of the water collector through which the airflow exits the water separator.

9 Claims, 4 Drawing Sheets

INTEGRATED MID-PRESSURE WATER SEPARATOR

BACKGROUND

Exemplary embodiments pertain to the art of aircraft environmental control systems (ECSs), and in particular to water removal or dehumidification of airflow via ECSs.

Water removal from, or dehumidification of, airflow is one of the primary functions of aircraft ECSs. Traditionally, the water removal has been done via a high pressure water collector or via low pressure water separation.

In high pressure water collection, water is condensed out of the air by reducing temperature on the air while the air is in a high pressure condition, prior to any turbine expansion. Lowering temperature on the air is accomplished through heat exchangers typically known as a condenser and sometimes also a reheater, where the hot side is the hot, humid high pressure air and the cold side is the cold air that has been dehumidified and has undergone turbine expansion. There are inherent inefficiencies from a thermodynamic viewpoint with this method as one is taking cold expanded air and then it heating back up to do the temperature condensation. There of course are also inefficiencies with the added weight, cost/complexity, and volume with the additional heat exchangers, ducts, sensors and couplings.

In low pressure water separation, water is condensed via turbine expansion prior to the air exiting the pack. The water coming off the turbine is often a very fine mist with a very small droplet size that would be difficult to gather using centrifugal forces and inertia alone. Therefore, water is coalesced into larger droplets with a cloth mesh filter prior to the water collecting can. This mesh is more burdensome because it needs regular schedule maintenance and the size of the water collecting can is also substantially bigger because of the low density of the air and the need to reduce axial velocities in order for the centrifugal forces to have any real effect in throwing water to the outer edges.

BRIEF DESCRIPTION

In one embodiment, a water separator includes an outer annular passage extending along a central longitudinal axis of water separator to direct an airflow along a first direction, and an inner annular passage located radially inboard of the outer annular passage and coaxial with the outer annular passage to direct the airflow along a second direction. A coalescer is located along the outer annular passage to coalesce water in the airflow. A water collector is located along the inner annular passage to collect the water. An airflow outlet is located downstream of the water collector through which the airflow exits the water separator.

Additionally or alternatively, in this or other embodiments a swirler vane is located in the inner annular passage to induce swirl into the airflow.

Additionally or alternatively, in this or other embodiments a skimmer is located along the inner annular passage to define a water collector inlet.

Additionally or alternatively, in this or other embodiments the coalescer includes one or more wavy fins located in the outer annular passage.

Additionally or alternatively, in this or other embodiments an 180 degree turn connects the outer annular passage to the inner annular passage.

Additionally or alternatively, in this or other embodiments the water separator is formed as a unitary single piece component.

In another embodiment, an environmental control system of an aircraft includes a primary heat exchanger, a secondary heat exchanger, and an air cycle machine including a compressor fluidly coupled to an outlet of the primary heat exchanger and an inlet of the secondary heat exchanger, a first turbine fluidly coupled to an outlet of the secondary heat exchanger, and a second turbine located downstream of the first turbine. A water separator is located fluidly between the first turbine and the second turbine. The water separator includes an outer annular passage extending along a central longitudinal axis of water separator to direct an airflow along a first direction, and an inner annular passage disposed radially inboard of the outer annular passage and coaxial with the outer annular passage to direct the airflow along a second direction. A coalescer is located along the outer annular passage to coalesce water in the airflow. A water collector is located along the inner annular passage to collect the water, and an airflow outlet is located downstream of the water collector through which the airflow exits the water separator.

Additionally or alternatively, in this or other embodiments a swirler vane is located in the inner annular passage to induce swirl into the airflow.

Additionally or alternatively, in this or other embodiments a skimmer is located along the inner annular passage to define a water collector inlet.

Additionally or alternatively, in this or other embodiments the coalescer includes one or more wavy fins located in the outer annular passage.

Additionally or alternatively, in this or other embodiments an 180 degree turn connects the outer annular passage to the inner annular passage.

Additionally or alternatively, in this or other embodiments the water separator is formed as a unitary single piece component.

In yet another embodiment, a method of operating an environmental control system of an aircraft includes flowing an airflow across a heat exchanger of the environmental control system, urging the airflow through a first turbine of an air cycle machine of the environmental control system, directing the airflow from the first turbine into an airflow inlet of a water separator, flowing the airflow through a coalescer located along an outer annular passage of the water separator to coalesce water in the airflow, turning the airflow into an inner annular passage located radially inboard of the outer annular passage, skimming the coalesced water droplets from the airflow, and directing the dehumidified airflow out of the water separator and into a second turbine of the air cycle machine.

Additionally or alternatively, in this or other embodiments the water droplets are urged toward an outer wall of the inner annular passage via a swirler vane located in the inner annular passage.

Additionally or alternatively, in this or other embodiments the water droplets are flowed from the skimmer into a water collector.

Additionally or alternatively, in this or other embodiments the coalescer includes one or more wavy fins located in the outer annular passage.

Additionally or alternatively, in this or other embodiments the airflow 180 is turned degrees between the outer annular passage to the inner annular passage.

Additionally or alternatively, in this or other embodiments the water separator is formed as a unitary single piece component.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
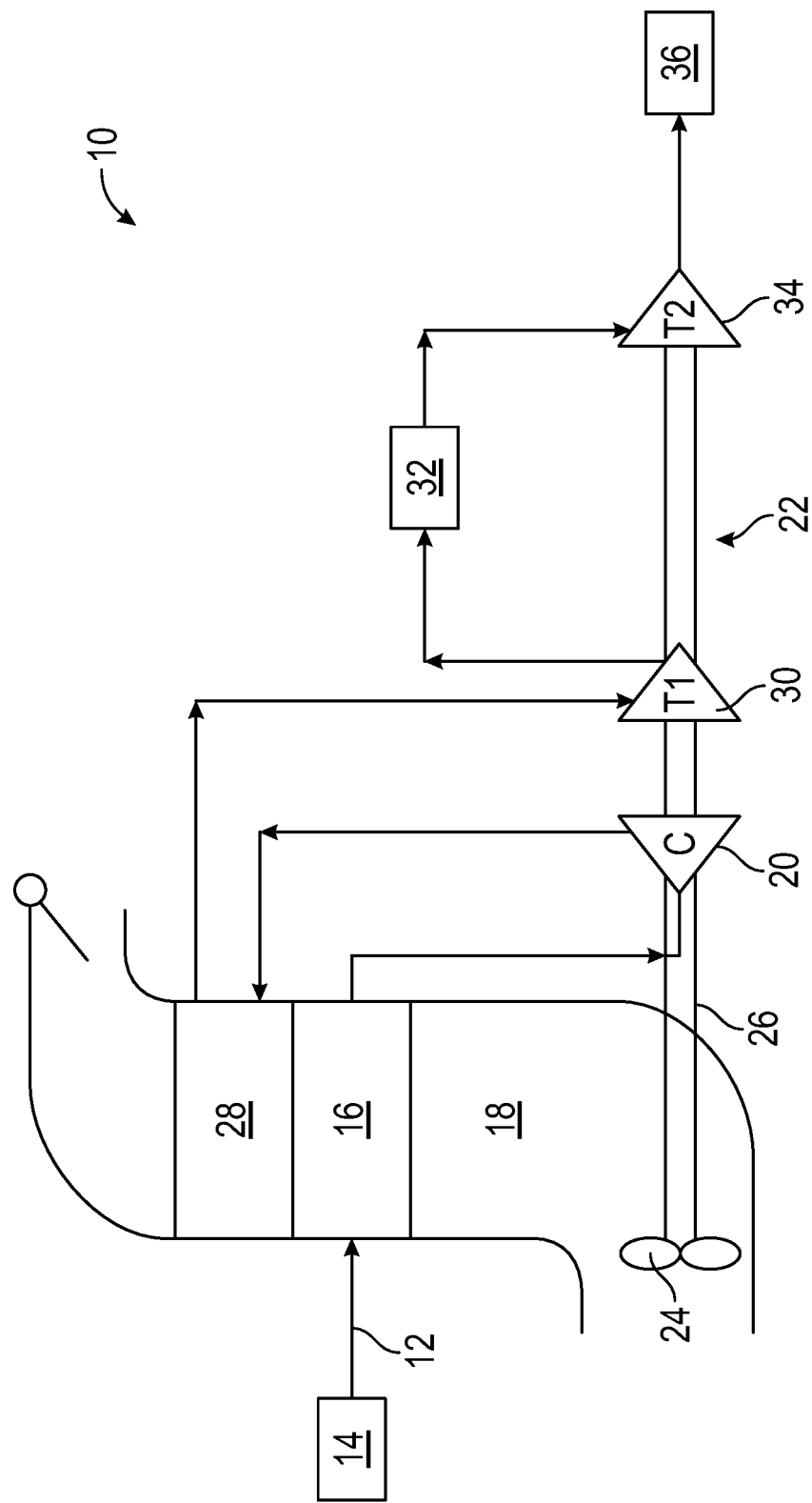
FIG. 1 is a schematic illustration of an embodiment of an environmental control system (ECS) for an aircraft.

Referring now to FIG. 1, illustrated is an embodiment of an environmental control system (ECS) 10 for an aircraft. The ECS 10 is supplied with, for example, bleed airflow 12 from a bleed air supply system 14 of a gas turbine engine. The bleed airflow 12 is input into a primary heat exchanger 16 of the ECS 10 where the bleed airflow 12 exchanges thermal energy with a RAM airflow 18, or alternatively ambient airflow. The bleed airflow is then directed through a compressor 20 of an air cycle machine 22. The compressor 20 and fan 24 are driven by, for example, turbine 30 and/or turbine 34 that shares a common shaft 26 with the compressor 20 and fan 24. After compression at the compressor 20, the compressed bleed airflow is directed to a secondary heat exchanger 28 where the compressed bleed airflow is cooled by thermal energy exchange with the RAM airflow 18. The bleed airflow 12 is then directed through a first turbine 30 of the air cycle machine 22 located at the shaft 26 for primary expansion. After primary expansion, the bleed airflow 12 is directed through a mid-pressure water separator 32 for dehumidification. Once dehumidified, the bleed airflow 12 then passes through a second turbine 34 for secondary expansion and then distributed to air loads of the aircraft, schematically identified as 36. In some embodiments, the second turbine 34 is located on the shaft 26, while in other embodiments the second turbine 34 may rotate independently from the first turbine 30. The air loads 36 may include, but are not limited to, a cabin of the aircraft.

Figure 2:
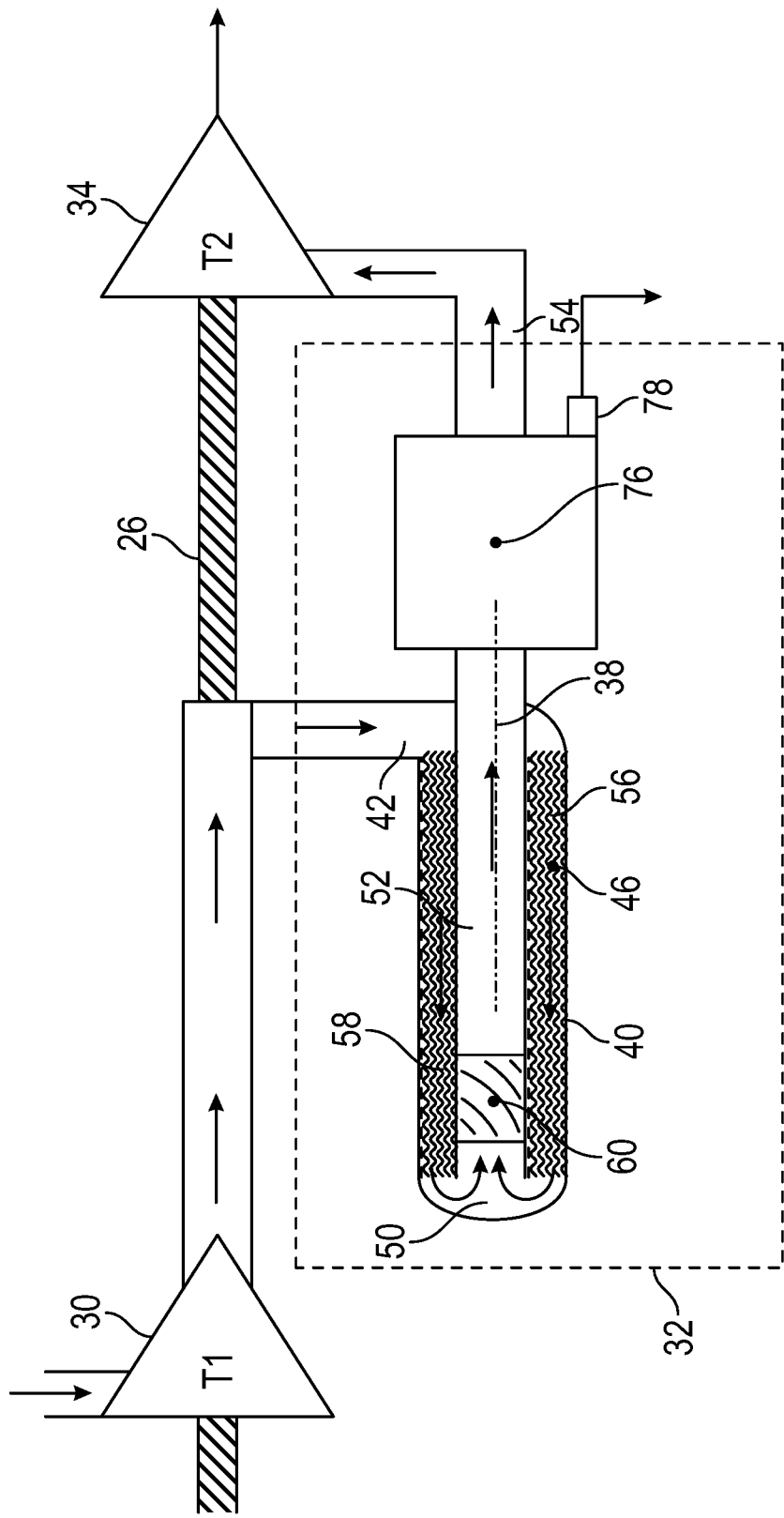
FIG. 2 is a schematic illustration of an embodiment of a water collection arrangement of an ECS.

Referring now to FIG. 2, illustrated is an embodiment of mid-pressure water separator 32 disposed downstream of the first turbine 30 and upstream of the second turbine 34 such that the airflow is directed from the first turbine 30, through the water separator 32, and then through the second turbine 34. The water separator 32 is a generally annular structure having a central longitudinal axis 38 and is enclosed in a housing 40. The water separator includes an airflow inlet 42 and an outer annular passage 46 extending from the airflow inlet 42 in a first direction along the central longitudinal axis 38. A 180 degree turn 50 is located in the housing 40 which connects the outer annular passage 46 to an inner annular passage 52 located radially inboard of the outer annular passage 46 relative to the central longitudinal axis 38. The inner annular passage 52 extends from the 180 degree turn 50 in a second direction along the central longitudinal axis 38 opposite the first direction.

An annular coalescer 56 is located in the outer annular passage 46. The coalescer 56 is configured to define a tortuous pathway for the airflow flowing through the coalescer 56 to knock the water out of suspension in the airflow and coalesce the water into larger droplets more easily separated from the airflow. In some embodiments, the coalescer 56 may include features such as one or more wavy fins 58 arranged across the outer annular passage 46 to define the tortuous pathway for the airflow.

Figure 3:
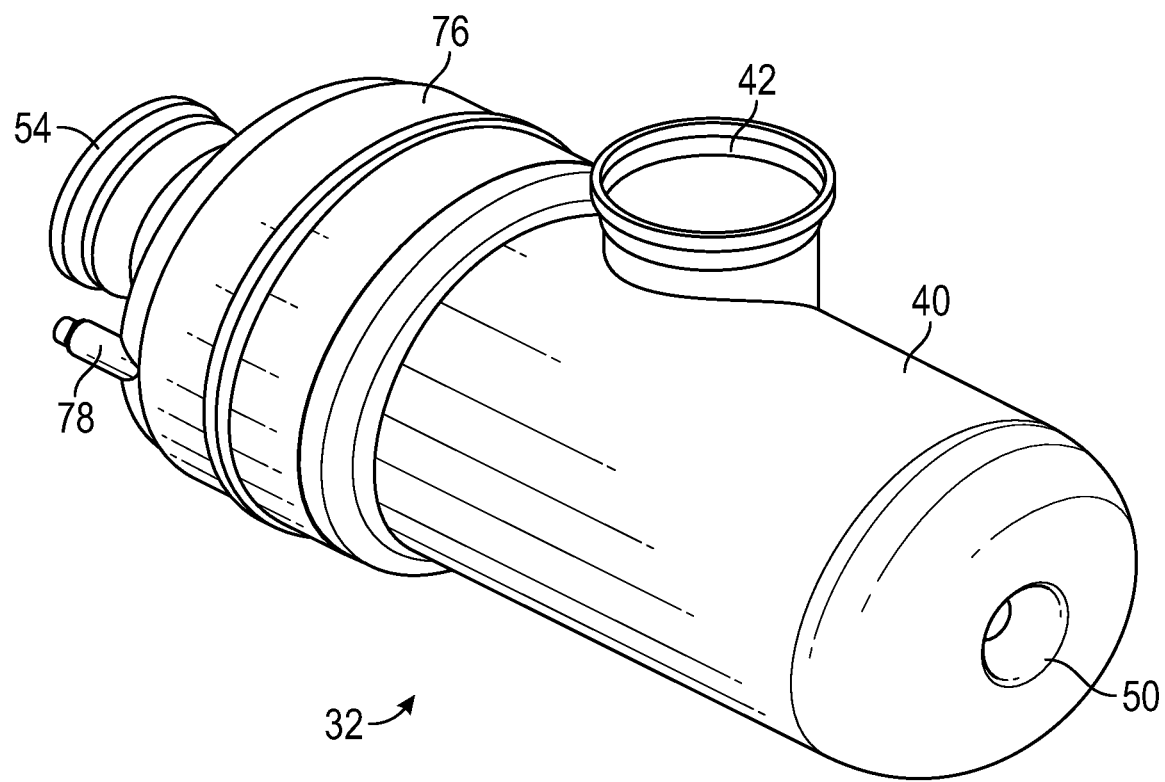
FIG. 3 is a perspective view of an embodiment of a water separator.
Figure 4:
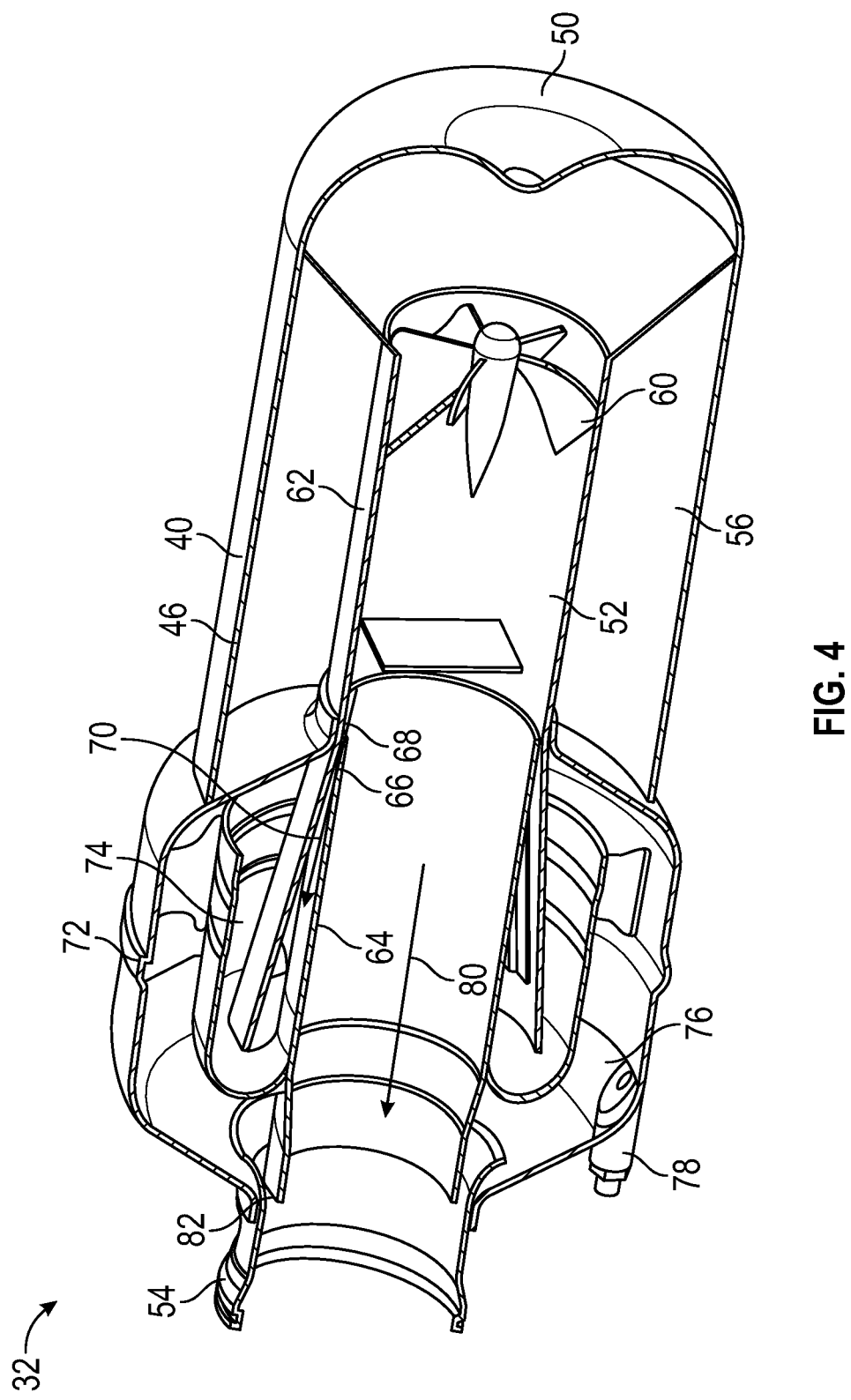
FIG. 4 is a partial cross-sectional view of an embodiment of a water separator.

Referring now to FIGS. 3 and 4, a swirler vane 60 is located in the inner annular passage 52 to induce swirl in the airflow in the inner annular passage 52 and urge the coalesced water droplets in the airflow toward an outer wall 62 of the inner annular passage 52, that radially divides the outer annular passage 46 from the inner annular passage 52. A skimmer 64 is positioned in the inner annular passage 52 downstream of the swirler vane 60. In some embodiments the skimmer 64 includes a skimmer wall 66 radially inboard of the outer wall 62 defining an annular skimmer passage 68 between the skimmer wall 66 and the outer wall 62 through which the water droplets, depicted schematically as 70, enter a water collector 72. The water collector 72 may include a tortuous pathway 74 through which the water droplets 70 are directed to a water collector can 76. The water collector can 76 may include a collector outlet 78 through which the collected water droplets 70 may be selectably output from the water collector 72 for reuse or disposal.

The airflow, depicted schematically as 80, is directed past the skimmer 64 and along the inner annular passage 52 to the airflow outlet 54. In some embodiments, an air re-entrainment opening 82 may connect the water collector 72 to the inner annular passage 52 to direct any airflow from the water collector 72 toward the airflow outlet 54. The airflow 80 then proceeds out of the airflow outlet 54 and toward the second turbine 34, such as shown in FIG. 2. In some embodiments, the water separator 32 is formed from a metal or plastic material, and may be formed as a unitary component by, for example, additive manufacturing.

Mid-pressure water separation, between the first turbine 30 and the second turbine 34, greatly simplifies the water separation structure by, for example, eliminating heat exchangers and interconnecting ducting usually utilized in traditional high pressure water separation. This reduces overall weight, cost and volume of the ECS 10. Further, using the annular passages in the water separator 32 reduces the overall length or volume of the water separator 32.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A water separator, comprising:
    an airflow inlet;
    an outer annular passage extending along a central longitudinal axis of the water separator to direct an airflow from the airflow inlet along a first direction;
    an inner annular passage disposed radially inboard of the outer annular passage and coaxial with the outer annular passage to direct the airflow along a second direction opposite the first direction, the outer annular passage and the inner annular passage separated by a shared outer passage wall;
    a coalescer disposed along the outer annular passage to coalesce water in the airflow;
    a water collector disposed along the inner annular passage to collect the water;
    an airflow outlet disposed along the inner annular passage downstream of the water collector through which the airflow exits the water separator, such that the airflow outlet and the inner annular passage are together a continuous straight and linear passage; and
    a 180-degree turn pathway formed in the water separator connecting the outer annular passage to the inner annular passage;
    wherein the 180-degree turn is disposed at a first axial end of the water separator and the airflow outlet is disposed at a second axial end of the water separator opposite the first axial end; and
    a swirler vane disposed in the inner annular passage nearer to the 180-degree turn pathway than to the airflow outlet to induce swirl into the airflow.

2. The water separator of claim 1, further comprising a skimmer disposed along the inner annular passage to define a water collector inlet.

3. The water separator of claim 1, wherein the water separator is formed as a unitary single piece component.

4. An environmental control system of an aircraft, comprising:
    a primary heat exchanger;
    a secondary heat exchanger;
    an air cycle machine including:
        a compressor fluidly coupled to an outlet of the primary heat exchanger and an inlet of the secondary heat exchanger;
        a first turbine fluidly coupled to an outlet of the secondary heat exchanger;
        a second turbine disposed downstream of the first turbine; and
        a water separator disposed fluidly between the first turbine and the second turbine, the water separator including:
            an airflow inlet;
            an outer annular passage extending along a central longitudinal axis of the water separator to direct an airflow from the airflow inlet along a first direction;
            an inner annular passage disposed radially inboard of the outer annular passage and coaxial with the outer annular passage to direct the airflow along a second direction opposite the first direction, the outer annular passage and the inner annular passage separated by a shared outer passage wall;
            a coalescer disposed along the outer annular passage to coalesce water in the airflow;
            a water collector disposed along the inner annular passage to collect the water; and
            an airflow outlet disposed downstream of the water collector along the inner annular passage through which the airflow exits the water separator, such that the airflow outlet and the inner annular passage are together a continuous straight and linear passage; and
            a 180-degree turn pathway formed in the water separator connecting the outer annular passage to the inner annular passage;
            wherein the 180-degree turn pathway is disposed at a first axial end of the water separator and the airflow outlet is disposed at a second axial end of the water separator opposite the first axial end; and
            a swirler vane disposed in the inner annular passage nearer to the 180-degree turn pathway than to the airflow outlet to induce swirl into the airflow.

5. The environmental control system of claim 4, further comprising a skimmer disposed along the inner annular passage to define a water collector inlet.

6. The environmental control system of claim 4, wherein the water separator is formed as a unitary single piece component.

7. A method of operating an environmental control system of an aircraft, comprising:
    flowing an airflow across a heat exchanger of the environmental control system;
    urging the airflow through a first turbine of an air cycle machine of the environmental control system;
    directing the airflow from the first turbine into an airflow inlet of a water separator;
    flowing the airflow through a coalescer disposed along an outer annular passage of the water separator to coalesce water in the airflow;
    turning the airflow 180-degrees into an inner annular passage disposed radially inboard of the outer annular passage via a 180-degree turn pathway disposed at a first axial end of the water separator;
    skimming the coalesced water droplets from the airflow; and
    directing the dehumidified airflow out of the water separator and into a second turbine of the air cycle machine via an airflow outlet disposed along the inner annular passage at a second axial end of the water separator opposite the first axial end;
    wherein the outer annular passage and the inner annular passage are separated by a shared outer passage wall;
    wherein the airflow outlet and the inner annular passage are together a continuous straight and linear passage; and
    urging the water droplets toward an outer wall of the inner annular passage via a swirler vane disposed in the inner annular passage nearer to the 180-degree turn pathway than to the airflow outlet.

8. The method of claim 7, further comprising flowing the water droplets from the skimmer into a water collector.

9. The method of claim 7, further comprising forming the water separator as a unitary single piece component.

* * * * *